_United States Patent_ [19]

Koeblitz

[11] 3,709,212
[45] Jan. 9, 1973

[54] MULTICHANNEL ELECTROCARDIOGRAPH HAVING ONE LESS INPUT AMPLIFIERS THAN THE NUMBER OF SIGNALS TO BE MEASURED

[75] Inventor: William E. Koeblitz, Lyndhurst, Ohio

[73] Assignee: Gould Inc., Chicago, Ill.

[22] Filed: Aug. 5, 1970

[21] Appl. No.: 61,165

[52] U.S. Cl. .............................................. 128/2.06 B
[51] Int. Cl. ................................................. A61b 5/04
[58] Field of Search ........ 128/2.06 B, 2.06 E, 2.06 G, 128/2.06 R, 2.06 V, 2.1 B, 2.1 R; 330/69, 147, 148; 328/156–159

[56] References Cited

UNITED STATES PATENTS

| 2,660,165 | 11/1953 | Miller | 128/2.06 B |
| 3,367,323 | 2/1968 | Schuler | 128/2.06 E |
| 2,684,278 | 7/1954 | Marchand | 128/2.06 B |

FOREIGN PATENTS OR APPLICATIONS

| 1,811,989 | 6/1970 | Germany | 128/2.06 E |

_Primary Examiner_—William E. Kamm
_Attorney_—Eber J. Hyde

[57] ABSTRACT

An electrocardiograph is described wherein one less input amplifier than the number of signals to be measured is coupled to circuitry for combining the signals with various scale factors to provide several different signals at different measuring terminals.

8 Claims, 4 Drawing Figures

PATENTED JAN 9 1973

INVENTOR.
WILLIAM E. KOEBLITZ
BY
ATTORNEY

MULTICHANNEL ELECTROCARDIOGRAPH HAVING ONE LESS INPUT AMPLIFIERS THAN THE NUMBER OF SIGNALS TO BE MEASURED

BACKGROUND OF THE INVENTION

1. Field of the Invention

This invention relates to the measurement and recording of bioelectric signals and, more particularly, to means for the simultaneous measurement or recording of a plurality of such signals.

2. Description of the Prior Art

Human and animal bodies develop at their surfaces, potentials which vary in accordance with bodily functions. This provides the medical researcher, as well as the diagnostician, with a powerful tool.

The best known use of this phenomenon is in the study of the functions of the human heart and diagnosing its ills. The instrument commonly used for this purpose is called an electrocardiograph (ECG). Electrodes are attached to the arms and legs of the patient or subject, and additional electrodes may contact the chest of the patient. Potential differences between various electrodes and combinations of electrodes vary with the action of the heart and are recorded on a moving chart by the ECG. The usual ECG records only one such varying potential difference at a time and, accordingly, the desired records are made in sequence, a multi-position switch being provided to select electrode connections.

It is desirable to record the various signals simultaneously so that interpretation of the records will not be confused by changes in the heart which may take place between successive recordings. Furthermore, simultaneous recording speeds the testing process. As shown in U. S. Pat. No. 2,627,267, for example, simultaneous recordings may be made by using, in effect, a separate ECG unit for each signal, but with the recording mechanisms writing on a common chart.

Electrocardiographic signals have amplitudes in the low millivolt range, while electroencephalographic signals are in the low microvolt range. Suitable chart recording instruments require signals of several volts. Thus, large amounts of amplification are required for each recording channel. The high cost of providing a plurality of high-gain signal channels often, in the past, has precluded simultaneous recording.

Where telemetry of the signals is required, it often happens that much other information also must be transmitted. With a limited number of information channels, this has made it necessary to accept fewer than the desired number of ECG channels.

An object of this invention is to provide less expensive means for simultaneous measurement of a plurality of signals of bioelectric origin.

Another object is to provide means for recording several bioelectric signals employing fewer amplifiers and transmission channels.

SUMMARY OF THE INVENTION

This invention provides means for measuring a plurality of potential differences of bioelectric origin developed between three or more signal conductors and employs a minimum number of differential input voltage amplifiers. The amplifiers are fewer in number than the number of potential differences to be measured, but not less than the number of signal conductors minus one. Circuit means connect the signal conductors to the inputs of the amplifiers, applying a different signal to each input. Circuit means connected to the outputs of the amplifiers deliver to each of a plurality of sets of measuring terminals the output signals from the amplifiers combined with a unique combination of polarities and scale factors at each set.

DESCRIPTION OF THE PREFERRED EMBODIMENTS

Figure 1:
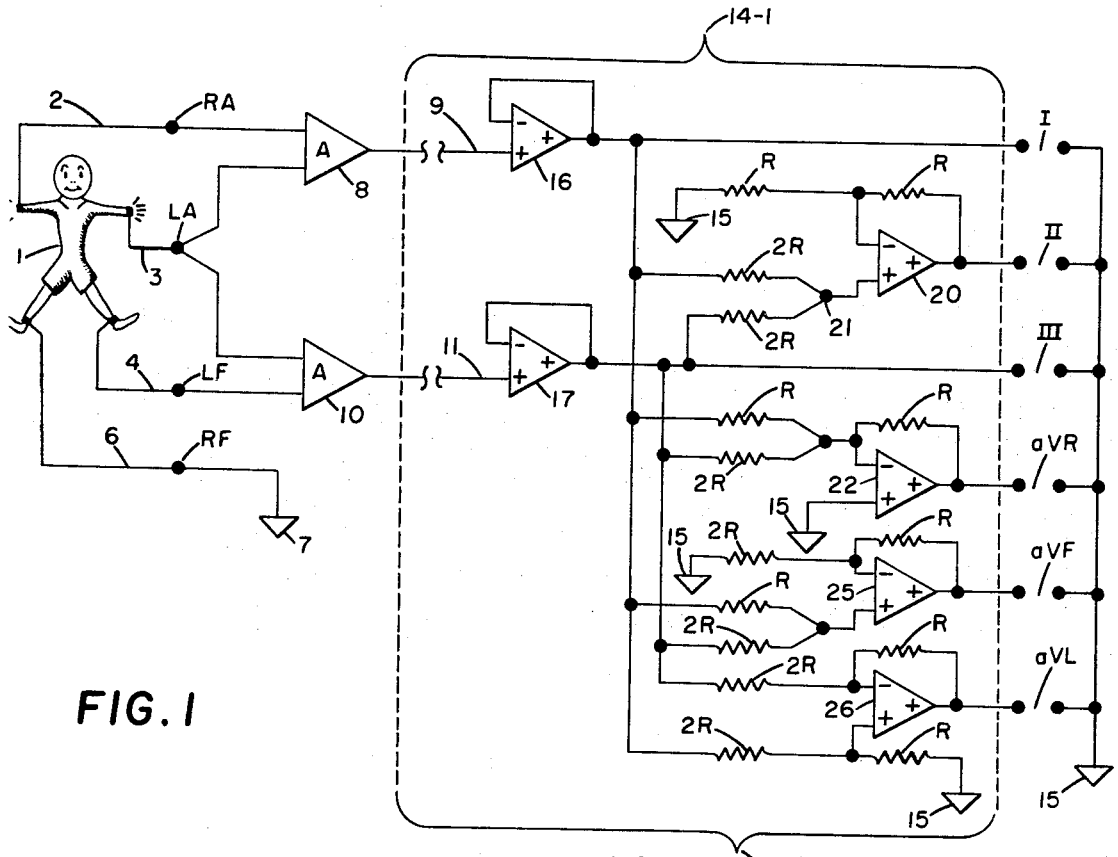
FIGS. 1, 2, 3, and 4 are circuit diagrams of means for measuring or recording simultaneously a plurality of electrocardiographic signals according to this invention.

FIG. 1 is a diagram of a system suitable for the simultaneous recording of six electrocardiographic signals using only two voltage amplifiers.

In operation, the subject or patient 1 has an electrode at the right arm connected by signal conductor 2 to input terminal RA. An electrode at the left arm is connected by signal conductor 3 to input terminal LA. An electrode at the left leg is connected by signal conductor 4 to input terminal LF. The six electrocardiographic signals to be recorded are obtained from these three measurement electrodes.

Two identical amplifiers, 8, 10, having differential input circuits, and having voltage amplification A, preferably on the order of 500, are connected to receive signals from signal conductors 2, 3, 4 via terminals RA, LA, LF. A reference electrode at the right leg is connected by conductor 6 to terminal RF which is shown connected to the common point 7 of amplifiers 8, 10, which may or may not be connected to earth.

Six sets of measurement terminals I, II, III, $a$VR, $a$VF, and $a$VL are provided. At each set of terminals there appears, amplified, the electrocardiographic potential difference normally identified with "lead" symbols I, II, III, $a$VR, $a$VF, and $a$VL, respectively. The signal appearing at terminals I thus corresponds to the signal normally associated with Standard Lead I, etc. Further information regarding the electrocardiographic lead system may be found in various reference books, such as: "Physiology and Biophysics" by Theodore Ruch and Harry Patton, nineteenth edition, Saunders Publishing Co., Philadelphia, Oct. 1965, pages 578,579.

Table I lists the lead designations and the definitions of the electrocardiographic potential differences associated therewith. Where two or three electrodes are grouped together, the desired potential is the average potential of the group.

TABLE I $e_r$ = potential at right arm electrode $e_l$ = potential at left arm electrode $e_f$ = potential at left leg electrode $e_p$ = potential at chest electrode

| Lead | Measurement Between Electrodes | Potential Difference Measured |
|---|---|---|
| I | L. Arm - R. Arm | $e_l - e_r = E_1$ |
| II | L. Leg - R. Arm | $e_f - e_r = E_2$ |

| | | |
|---|---|---|
| III | L. Leg - L. Arm | $e_f - e_l = E_3$ |
| aVR | R. Arm - (L. Arm & (L. Leg | $e_r - \frac{1}{2} e_l - \frac{1}{2} e_f = E_4$ |
| aVF | L. Leg⊢(R. Arm & (L. Arm | $e_f - \frac{1}{2}e_l - \frac{1}{2}e_r$ |
| aVL | L. Arm - (R. Arm & (L. Leg | $e_l - \frac{1}{2} e_f - \frac{1}{2} e_r = E_6$ |
| V | Chest - (R. Arm, (L. Arm, (L. Leg | $e_p - \frac{1}{3} e_f - \frac{1}{3} e_r - \frac{1}{3} e_l = E_7$ |

The six signals, appearing at the measurement terminals, are derived from the output signals from amplifiers 8, 10 by circuit means 14–1, as hereinafter explained.

Amplifier 8 is connected at its differential input to the left arm through terminal LA and to the right arm through terminal RA. The input signal (refer to Table I) is $(e_l - e_r) = E_1$, and the output signals is $AE_1$.

Amplifier 10 is connected at its differential input to the left leg through terminal LF and to the left arm through terminal LA. The input signal is $(e_f - e_l) = E_3$, and the output signal is $AE_3$.

The output signals $AE_1$ and $AE_3$ from amplifiers 8, 10 go to circuit means 14–1 where the signals are combined with appropriate scale factors and polarities to provide all the signals required at measuring terminals I, II, III, aVR, aVF, aVL.

Circuit means 14–1 includes six operational amplifiers connected to perform various functions. Such amplifiers are now well known and used in a large number of applications. They are small, available in integrated circuit form, inexpensive, and simple to use. In view of the widespread use of such amplifiers, detailed descriptions of each application in 14–1 will not be given. For simplicity, the resistive networks external to the operational amplifiers to determine scale factors are shown as made up of resistors designated by their ohmic values R, and multiples of R. Typical values for R range from about one thousand ohms to one hundred thousand ohms. The common point in circuit means 14–1 is designated by triangular symbols 15 similar to 7, but points 7 and 15 are not necessarily at the same potential, depending on the nature of lines 9, 11. If further information on operational amplifiers and their applications is desired, reference may be had to numerous publications on the subject, for example: "Operational Amplifiers" by Ray Stata, in "Electromechanical Design," part II, November 1965.

The signals from amplifiers 8, 10 go to buffer amplifiers 16, 17 which are operational amplifiers connected as voltage followers. They provide low source resistance for some of the measurement terminals and for driving other operational amplifiers which are used for combining signals. The output signal from buffer 16 is $AE_1$ and the output signal from buffer 17 is $AE_3$. Alternatively, buffer amplifiers 16, 17 could have suitable resistance networks at their inverting inputs to provide voltage amplification, in which case the term A in the following analysis would include the combined amplification of amplifiers 8 and 16; and the combined amplification of amplifiers 10 and 17.

The derivations of the signals for the measurement terminals are described in the following paragraphs using the expressions of Table I.

Measurement Terminals I – FIG. 1

The signal at terminals I is $AE_1$ (Table I). It is obtained directly from the output of amplifier 16.

Measurement Terminals II – FIG. 1

The signal at terminals II is $AE_2$. It is obtained by combining $AE_1$ and $AE_3$ at the non-inverting input of amplifier 20:

$$AE_1 = A(\rho_l - \rho_r)$$
$$AE_3 = A(\rho_f - \rho_l)$$
$$\overline{A(E_1 + E_3) = A(\rho_f - \rho_r) = AE_2}$$

Measurement Terminals III – FIG. 1

The signal at terminals III is $AE_3$. It is obtained directly from the output of amplifier 17.

Measurement Terminals aVR – FIG. 1

The signal at terminals aVR is $AE_4$. It is obtained by combining $AE_1$ and $AE_3$ at the inverting input of amplifier 22, with $AE_3$ scaled to one-half:

$$-AE_1 = A(-\rho_l + \rho_r)$$
$$-1/2 AE_3 = A(-1/2\rho_f + 1/2\rho_l)$$
$$\overline{-A(E_1 + 1/2 E_3) = A(\rho_r - 1/2\rho_l - 1/2\rho_f) = AE_4}$$

Measurement Terminals aVF – FIG. 1

The signal at terminals aVF is $AE_5$. It is obtained by combining $AE_1$ and $AE_3$ at the non-inverting input of amplifier 25, with $AE_1$ scaled to one-half:

$$1/2 AE_1 = A(1/2\rho_l - 1/2\rho_r)$$
$$AE_3 = A(\rho_f - \rho_l)$$
$$\overline{A(1/2 E_1 + E_3) = A(\rho_f - 1/2\rho_l - 1/2\rho_r) = AE_5}$$

Measurement Terminals aVL – FIG. 1

The signal at terminals aVL is $AE_6$. It is obtained by combining $AE_1$ and $AE_3$ at amplifier 26. $AE_3$ is applied to the inverting input with scale factor of one-half, and $AE_1$ is applied to the non-inverting input, also with scale factor of one-half:

$$1/2 AE_1 = A(1/2\rho_l - 1/2\rho_r)$$
$$-1/2 AE_3 = A(1/2\rho_f + 1/2\rho_l)$$
$$\overline{1/2 A(E_1 - E_3) = A(\rho_l - 1/2\rho_f - 1/2\rho_r) = AE_6}$$

Summary – FIG. 1

In FIG. 1 the composition of the signal at each set of measuring terminals I, II, III, aVR, aVF, aVL may be expressed in the form $A(bE_1 + cE_3)$ where $b$ and $c$ are scale factors and are given plus or minus signs to indicate polarity; $E_1$, $E_3$ are the input signals to amplifiers 8, 10 respectively; and A is the voltage amplification of amplifiers 8, 10. To account for further amplification, or attenuation, that could be incorporated in circuit means 14–1, this expression may be generalized to $K(bE_1 + cE_3)$. The signals and their composition are summarized in Table II.

TABLE II

| Terminals | Signal | Composition of Signal = $A(bE_1 + cE_3)$ | |
|---|---|---|---|
| | | b | c |
| I | $AE_1 = A(e_l - e_r)$ | +1 | 0 |
| II | $AE_2 = A(e_f - e_r)$ | +1 | +1 |
| III | $AE_3 = A(e_f - e_l)$ | 0 | +1 |
| aVR | $AE_4 = A(e_r - \frac{1}{2} e_l - \frac{1}{2} e_f)$ | -1 | -½ |
| aVF | $AE_5 = A(e_f - \frac{1}{2} e - \frac{1}{2}e_r)$ | 0 | +1 |
| aVL | $AE_6 = A(e_l - \frac{1}{2} e_f - \frac{1}{2} e_r)$ | +½ | -½ |

From Table II it can be seen that at each set of measuring terminals the signals from amplifiers 8, 10 have been combined with a unique combination of scale factors and polarities, some of the scale factors being zero. Furthermore, by comparing Tables I and II, it can be seen that the signal at each set of measuring terminals represents the potential difference usually associated with lead symbols I, II, III, $a$VR, $a$VF, $a$VL.

The measuring terminals may be connected to a six-channel oscillograph for simultaneous recording of all six signals, or the signals may be otherwise processed and measured.

If the amplifiers 8, 10 have different amplification factors, then compensation for the difference may be made by suitably adjusting the scale factors at the operational amplifiers 20, 22, 25, 26. The signals at the measuring terminals may then be expressed in the following form:

$$AE_n = A_8 (gE_1) + A_{10} (hE_3)$$

where $A_8$ and $A_{10}$ are the different amplification factors of amplifiers 8, 10, respectively, and g and h are adjusted scale factors. Alternatively, gain compensation may be made by suitably altering the gain of amplifier 16 or 17.

Circuit means 14-1 may be combined physically with amplifiers 8, 10, in which case, points 7 and 15 would be common. Alternatively, they may be separated, with the signals transmitted in any suitable manner, in which case, points 7 and 15 may not be at the same potential. For example, amplifiers 16, 17, and the circuits to the right thereof in FIG. 1, may be at a remote location. This possibility is indicated by the breaks in signal lines 9, 11, connecting amplifiers 8, 10 to buffer amplifiers 16, 17. Lines 9, 11 of circuit means 14-1 then include means for transmitting signals $AE_1$ and $AE_3$ to the remote location. Suitable transmission means include a multi-wire cable, a radio telemetry link, and a two-channel magnetic tape recorder at the patient location, and a corresponding reproducer at the remote location.

It is not necessary to employ the specific connections between electrodes (input terminals RA, LA, LF) and the amplifier inputs shown in FIG. 1. Many other arrangements may be employed within the scope of this invention. For example, the input of amplifier 10 could be connected to the left leg electrode through terminal LF, and to the right arm electrode through terminal RA. The output signal would then be $AE_2$ rather than $AE_3$, and this would require rearranging circuit means 14-1 to derive the various required signals from $AE_1$ and $AE_2$, rather than from $AE_1$ and $AE_3$.

Figure 2:
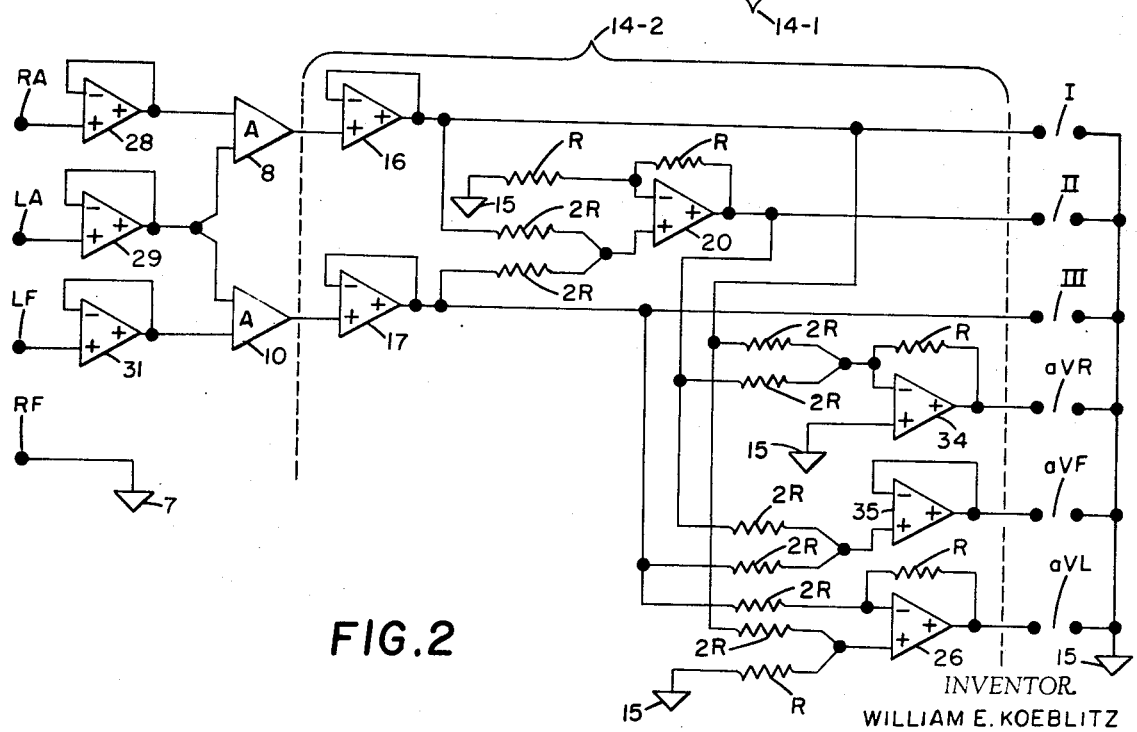

FIG. 2 shows a different arrangement of the amplifier input — electrode connections. In this case, the circuit means supplying signals from signal conductors 2, 3, 4 to the inputs of amplifiers 8, 10 include buffer amplifiers 28, 29, 31. These are operational amplifiers connected as voltage followers, providing the advantage that the input resistance "seen" by the electrodes may be very high, thus reducing errors due to electrode-patient contact resistance. Using the notations of Table I, the output signal from buffer 28 is $e_r$, the output signal from buffer 29 is $e_l$, and the output signal from buffer 31 is $e_f$.

The differential input of amplifier 8 is connected to the outputs of amplifiers 28, 29 and the input signal, therefore, is $E_1$ (Table I), and the output signal is $AE_1$, as in FIG. 1. Similarly, the input signal to amplifier 10 is $E_3$, and the output signal is $AE_3$. The output signals are supplied to, and processed by, circuit means 14-2.

Circuit means 14-2 combine signals $AE_1$ and $AE_3$ from amplifiers 8, 10, with appropriate scale factors and polarities to provide all the signals required at measurement terminals I, II, III, $a$VR, $a$VF, $a$VL.

At the input end of circuit means 14-2 are buffer amplifiers 16, 17, as in FIG. 1. The output signal from amplifier 16 is $AE_1$, and the output signal from amplifier 17 is $AE_3$.

The derivations of the signals for the measurement terminals is described in the following paragraphs using the expressions of Table I.

Measurement Terminals I, II, III — FIG. 2

The signals for these terminals are obtained as described in connection with FIG. 1.

Terminals $a$VR — FIG. 2

The signal at terminals $a$VR is $AE_4$. It is obtained by combining $AE_1$ and derived signal $AE_2$ at the inverting input of amplifier 34, each with scale factor of one-half. Since derived signal $AE_2 = AE_1 + AE_3$ (Table II), it can be shown that this is equivalent to the derivation of $AE_4$ in FIG. 1.

Terminals $a$VF — FIG. 2

The signal at terminals $a$VF is $AE_5$. It is obtained by combining derived signal $AE_2$ and $AE_3$ at the non-inverting input of amplifier 35, each with scale factor of one-half. Since derived signal $AE_2 = AE_1 + AE_3$, it can be shown that this is equivalent to the derivation of $AE_5$ in FIG. 1.

Measuring Terminals $a$VL — FIG. 2

The signal for terminals $a$VL is obtained as described in connection with FIG. 1.

Summary — FIG. 2

The signals at each set of measuring terminals in FIG. 2 may also be expressed as in Table II.

Figure 3:
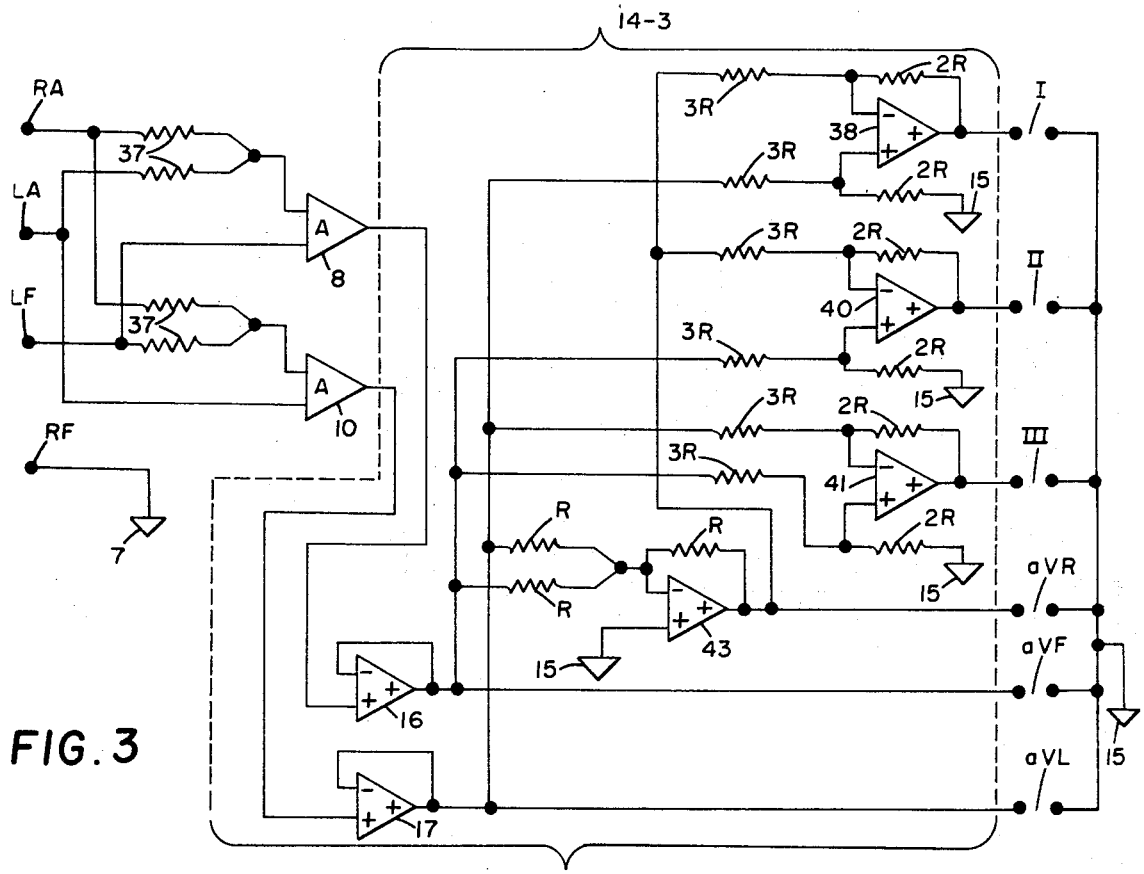

To further illustrate the possibilities for variations in the circuit arrangements, FIG. 3 shows the inputs of amplifiers 8, 10 connected in still a different way. Each input is connected to all three signal electrodes.

The input of amplifier 8 is connected directly to the left leg through terminal LF and to the left and right arms through equal resistors 37 and terminals LA, RA. Thus, the signal input to amplifier 8 is the difference between the potential at the left leg electrode, and the average of the potentials at the two arm electrodes $E_5$ (Table 1), and the output signal is $AE_5$.

The input of amplifier 10 is connected directly to the left arm through terminal LA, and to the left leg and right arm through equal resistors 37 and terminals LF and RA. Thus, the input signal to amplifier 10 is the difference between the potential at the left arm electrode, and the average of the potentials at the right arm and left leg electrodes $E_6$, and the output signal is $AE_6$.

The output signals from amplifiers 8, 10 are processed by circuit means 14-3 and delivered thereby with appropriate polarities and scale factors to measuring terminals I, II, III, $a$VR, $a$VF, $a$VL.

In circuit means 14-3, buffer amplifiers 16, 17 receive the output signals from amplifiers 8, 10, and the output signals are $AE_5$ and $AE_6$. The signals applied to the measurement terminals are obtained or derived as described in the following paragraphs:

Measurement Terminals $a$VL — FIG. 3

The signal at terminals $a$VL is $AE_6$ and is obtained directly from amplifier 17.

Measurement Terminals $a$VF — FIG. 3

The signal at terminals $a$VF is $AE_5$ and is obtained directly from amplifier 16.

Measurement Terminals $a$VR — FIG. 3

The signal at terminals $a$VR is $AE_4$ (Table I). It is obtained by combining signals $AE_5$ and $AE_6$ at the inverting input of amplifier 43.

Measurement Terminals III — FIG. 3

The signal at terminals III is $AE_3$. It is obtained by combining $AE_6$ and $AE_5$ at amplifier 41. Signal $AE_6$ is applied to the inverting input with scale factor of two-thirds, and $AE_5$ is applied to the non-inverting input also with scale factor of two-thirds.

Measurement Terminals II — FIG. 3

The signal at terminals II is $AE_2$. It is obtained by combining $AE_5$ with derived signal $AE_4$ at amplifier 40. Signal $AE_4$ is applied to the inverting input with scale factor of two-thirds, and $AE_5$ is applied to the non-inverting input, also with scale factor of two-thirds.

Since derived signal $AE_4 = - A(E_5 + E_6)$ (See Measurement Terminals $a$VR — FIG. 3), it can be shown that this is equivalent to combining directly obtained signals $AE_6$ and $AE_5$ at the non-inverting input of an operational amplifier with scale factor of four-thirds for $AE_5$ and two-thirds for $AE_6$.

Measurement Terminals I — FIG. 3

The signal at terminals I is $AE_1$. It is obtained by combining signal $AE_6$ with derived signal $AE_4$ at amplifier 38. Signal $AE_4$ is applied to the inverting input with scale factor of two-thirds, and $AE_6$ is applied to the non-inverting input, also with scale factor of two-thirds. Since derived signal $AE_4 = - A(E_5 + E_6)$ (See: Terminals $a$VR - FIG. 3), it can be shown that this is equivalent to combining directly obtained signals $AE_5$ and $AE_6$ at the non-inverting input of an operational amplifier with scale factors of four-thirds for $AE_6$ and two-thirds for $AE_5$.

Summary — FIG. 3

In FIG. 3, the composition of the signal at each set of measuring terminals may e expressed in the form $AE = a(l E_5 + m E_6)$ where $l, m$ are scale factors and are given plus or minus signs to indicated polarity, $E_5, E_6$ are the input signals to amplifiers 8, 10, and $A$ is the voltage amplification of the amplifiers. The signals and their composition are summarized in Table III.

TABLE III

| Terminals | Signal | Composition of Signal = $A(lE_5 + mE_6)$ $l$ $m$ |
|---|---|---|
| I | $AE_1 = A(e_l - e_r)$ | $+\frac{2}{3} +4/3$ |
| II | $AE_2 = A(e_f - e_r)$ | $+4/3 + \frac{2}{3}$ |
| III | $AE_3 = A(e_f - e_l)$ | $+\frac{2}{3} - \frac{2}{3}$ |
| $a$VR | $AE_4 = A(e_r - \frac{1}{2}e_l - \frac{1}{2}f)$ | $-1 -1$ |
| $a$VF | $AE_5 = A(e_f - \frac{1}{2}e_l - \frac{1}{2}e_r)$ | $+1\ 0$ |
| $a$VL | $AE_6 = A(e_l - \frac{1}{2}e_f - \frac{1}{2}e_r)$ | $0 +1$ |

From Table III it can be seen that at each set of measuring terminals the signals from the differential amplifiers have been combined with a unique combination of scale factors and polarities, some of the scale factors being zero.

Figure 4:
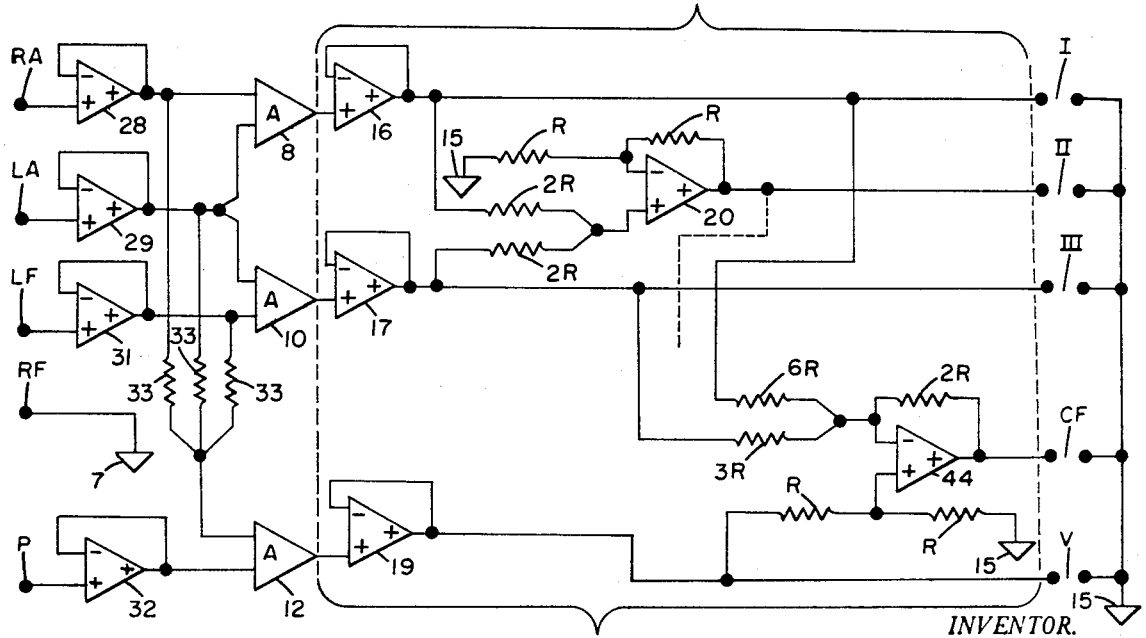

The invention is not limited to the use of three measurement electrodes and two voltage amplifiers. Additional electrodes, for example, one or more chest electrodes, may be employed. Several potential differences between such an electrode and limb electrodes in different combinations may be made available for measurement by adding only one voltage amplifier, preferably identical with amplifiers 8, 10. One example is shown in FIG. 4. The upper portion of this figure is the same as the upper portion of FIG. 2. However, terminals $a$VR, $a$VF, and $a$VL of FIG. 2 have been omitted for clarity. An electrode at the chest of the patient, not shown, has electrocardiographic potential $e_p$. The electrode is connected through input terminal P to the input of buffer amplifier 32, which is the same as amplifiers 28, 29, 31. Thus, the output signal from amplifier 32 is $e_p$. Amplifier 12 is the same as amplifiers 8, 10. The differential input is connected to the output of buffer 32 and to three equal resistors 33 which connect also to the outputs of buffers 28, 29, 31. The input signal to amplifier 12, therefore, is $e_p - \frac{1}{3} e_r - \frac{1}{3} e_l - \frac{1}{3} e_f = E_7$, which is the "V lead" signal (Table I). The output $AE_7$, therefore, is delivered to measurement terminals V by buffer 19.

By combining the output signals from amplifiers 8, 10, 12 with suitable scale factors and polarities, it is possible to obtain a number of additional signals which sometimes are used in electrocardiography. For example, amplifier 44 in FIG. 4 is connected to deliver to measuring terminals CF a signal corresponding to the potential difference between the chest electrode and the left leg electrode $(e_p - e_f)$. Signal $AE_1$ is applied to the inverting input of amplifier 44 with scale factor of one-third, $AE_3$ is applied to the inverting input with scale factor of two-thirds, and $AE_7$ is applied to the non-inverting input with scale factor of one:

$$-1/3 AE_1 = A(-1/3 \rho_l + 1/3 \rho_r)$$
$$-2/3 AE_3 = A(-2/3 \rho_f + 2/3 \rho_l)$$
$$\underline{AE_7 = A(\rho_p - 1/3 \rho_r - 1/3 \rho_l - 1/3 \rho_f)}$$
$$A(E_7 - 1/3 E_1 - 2/3 E_3) = A(\rho_p - \rho_f)$$

In similar manner, the signal developed between the chest electrode and the other limb electrodes, or combinations thereof, may be obtained by combining the output signals of the three voltage amplifiers with suitable polarities and scale factors.

From the foregoing examples it can be seen that in some cases, FIGS. 1 and 2, for example, the signal input to an amplifier, such as amplifier 8, may be, or corresponds to, the potential difference between two electrodes. In other cases, the input signal may be, or correspond to, the difference in potential between more than two electrodes. For example, in FIG. 3, the input signal is the difference between the potential at one electrode and the average of the potentials at two other electrodes.

It is convenient to use operational amplifiers as shown in the figures for scaling and combining the various signals with selected polarities. However, it should be recognized that the use of operational amplifiers is not a requirement as other means are available and well understood by those skilled in electronics. To cite one example, amplifier 20 in FIG. 1 could be eliminated. Point 21 would then be connected to the "high" terminal of terminal pair II. This would reduce the signal at terminals II to one-half, and would introduce a source resistance equal to R, thus requiring higher sensitivity in the measuring or recording device connected to these terminals.

The expressions "measuring" and "measurement" are used herein in a broad sense to include such techniques as recording on a moving chart as in conventional electrocardiography, observation on a cathode ray oscilloscope, recording on magnetic tape, and analysis by computer methods.

The expression "measuring terminals" as used herein is intended to denote points in the system where the desired signals are available for measurement and may or may not include terminals per se, such as binding posts, receptacles, etc.

FIGS. 1, 2, 3 show three of many possible circuit configurations, employing the present invention, which make available for measurement six electrocardiographic potential differences, using only two differential input voltage amplifiers. Prior to this invention, six such voltage amplifiers would have been used. As shown and described in connection with FIG. 4, one additional voltage amplifier makes available for measurement several additional electrocardiographic potential differences. This reduction in the number of voltage amplifiers is of considerable economic significance as the cost of a differential input amplifier suitable for multichannel ECG recording is an order of magnitude greater than the cost of an operational amplifier suitable for use in circuit means 14.

It is, of course, not necessary to utilize all of the signal channels or to include the circuit components peculiar to the unused measuring terminals. The advantage of this invention may be obtained with only three sets of measuring terminals.

What is claimed is:

1. An electrocardiograph system comprising at least three electrode means for connection to a patient for measuring a plurality of potential differences of bioelectric origin developed between the said electrode means; signal conductors being at least three in number connected to said at least three electrode means;

a plurality of differential input amplifiers, fewer in number than the number of potential differences to be measured, but not less than the number of said conductors minus one;

first circuit means connected to said signal conductors and to said amplifiers to apply a different signal to the input of each of said amplifiers, each signal corresponding to a difference in potential between conductors of said plurality of signal conductors;

a plurality of sets of measuring terminals, one set for each of said potential differences to be measured;

second circuit means connected to the outputs of said amplifiers and to said sets of measuring terminals and adapted to deliver to each of said sets of measuring terminals the output signals from said amplifiers; and means connected to said sets of measuring terminals for measuring said output signals.

2. Means as described in claim 1 wherein said circuit means connected to said sets of terminals comprise operational amplifiers.

3. Means as described in claim 1 wherein said signal conductors are three in number, said differential input amplifiers two in number, the input of one amplifier is connected to two of said three conductors, and the input of the other amplifier is connected to a different two of said three conductors.

4. An electrocardiograph adapted to record simultaneously a plurality of ECG signals developed between three signal electrodes comprising:

only two differential input amplifiers fewer in number than the three signals to be measured;

first circuit means connected to said electrodes and to said amplifiers to apply a different signal to the input of each of said amplifiers, each signal corresponding to a difference in potential between electrodes of said three signal electrodes;

a plurality of sets of measuring terminals, one set for each of said ECG signals to be recorded;

second circuit means connected to the outputs of said amplifiers and to said sets of measuring terminals and adapted to deliver to each of said sets of measuring terminals the output signals from said amplifiers; and means connected to said sets of measuring terminals for measuring said output signals.

5. An electrocardiograph as described in claim 4 wherein said means for measuring said output signals comprises a multi-channel oscillograph having a different channel connected to each of said sets of measuring terminals.

6. An electrocardiograph as described in claim 4 in which said signal electrodes are located at the left arm, right arm, and left leg of a subject, and said circuit means connected to said electrodes apply a signal corresponding to the potential difference between two of said electrodes to the input of one of said amplifiers and apply a signal corresponding to the potential difference between a different two of said electrodes to the input of the other of said amplifiers.

7. An electrocardiograph as described in claim 4 in which said signal electrodes are located at the left arm, right arm, and left leg of a subject, and said first circuit means connected to said electrodes applied to the input of one of said amplifiers a signal corresponding to the difference between the potential of a first one of said electrodes and the average of the potentials at the second and third ones of said electrodes, and applies to the input of the other of said amplifiers a signal corresponding to the difference between the potential of the second or third of said electrodes and the average of the potentials of the first and the third or second of said electrodes.

8. An electrocardiograph as described in claim 4 wherein at one of said sets of measuring terminals the scale factor for the signal component from one of said amplifiers is zero and at another of said sets of terminals the scale factor for the signal component from the other of said amplifiers is zero.

* * * * *